No. 812,881. PATENTED FEB. 20, 1906.
A. RICHARDSON.
HANGER OR EAR FOR OVERHEAD ELECTRIC TROLLEY WIRES.
APPLICATION FILED FEB. 6, 1905.

WITNESSES.
E. Howard
S. G. James

INVENTOR.
A. Richardson
by Howard O'Brien
atty

UNITED STATES PATENT OFFICE.

ABRAHAM RICHARDSON, OF BLACKPOOL, ENGLAND, ASSIGNOR OF SEVEN-EIGHTHS TO JOSEPH HEAP, HENRY HEAP, JAMES BAILEY, THOMAS BRIERLEY, ROBERT BILLINGTON, JAMES HAYDOCK, AND THOMAS SMITH JONES, OF BLACKPOOL, ENGLAND.

HANGER OR EAR FOR OVERHEAD ELECTRIC TROLLEY-WIRES.

No. 812,881.

Specification of Letters Patent.

Patented Feb. 20, 1906.

Application filed February 6, 1905. Serial No. 244,375.

*To all whom it may concern:*

Be it known that I, ABRAHAM RICHARDSON, a British subject, and a resident of Blackpool, in the county of Lancaster, England, have invented certain new and useful Improvements in Hangers or Ears for Overhead Electric Trolley-Wires, of which the following is a specification.

This invention relates to ears or hangers for supporting or holding up electric conductor-wires to which the wires are secured mechanically by clamping two sides of the hanger together without the necessity of soldering the conductor-wire thereto.

It is designed to provide a hanger and ear which will firmly grip and securely hold the wire, which is simpler in construction and manipulation, and which can be produced at comparatively small cost.

The invention will be fully described with reference to the accompanying drawings, in which a form of the invention is illustrated.

Figure 1:
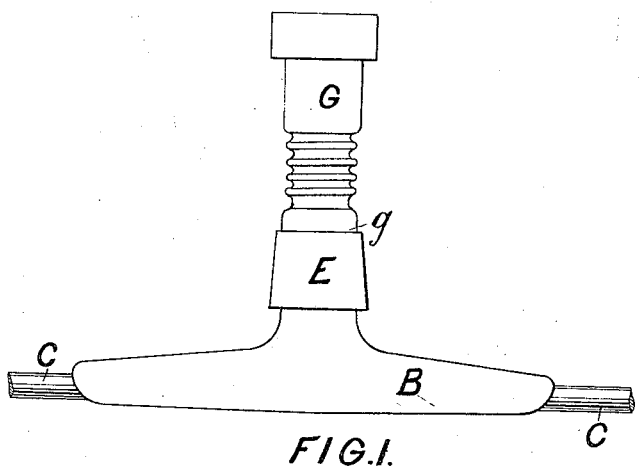
Figure 2:
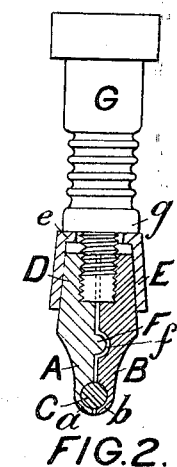
Figure 3:
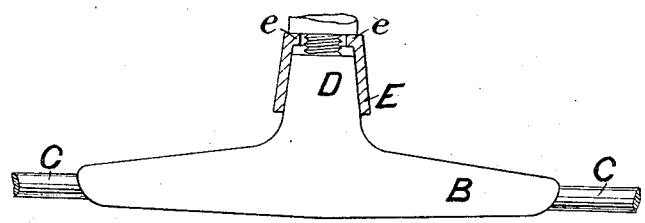

Figure 1 is a side elevation of the invention; Fig. 2, a transverse section of same; Fig. 3, a side elevation, partly in section.

The hanger and ear is constructed of two parts or jaws A and B, with grooves $a$ and $b$ to receive the conductor-wire C, as is customary in what are known or described as "mechanical hangers or ears." The jaws may wholly or partially grip the wires.

The jaws A and B are formed with shanks D flat on one side, which, when the two parts or jaws A and B are brought together form a shank conical or tapering slightly upward toward the top. Between the shanks an internally-screwed socket is formed, part in each shank, to receive the end of the insulator-bolt G. The insulator-bolt G is formed with a shoulder $g$.

Over the tapered shank D a collar E is placed, which is forced down by the shoulder $g$ of the insulator-bolt G over the shank and compresses the lower edges of the jaws A and B tightly upon the conductor-wire C, which fits within the grooves $a$ and $b$. The insulator-bolt G also serves to force the two parts of the shank D asunder against the sides of the collar E. The collar E is provided with an inwardly-projecting flange $e$, against which the shoulder $g$ of the insulator-bolt G engages.

A dowel-pin or other projection F on the jaw A fits into a hole or recess $f$ in the jaw B to insure the two jaws being placed together in the correct position.

What I claim as my invention, and desire to protect by Letters Patent, is—

1. An ear or hanger for supporting or holding up electric conductor-wires constructed with two jaws to grip the wires upwardly-extending tapered shanks to said jaws an internally-screwed socket between the said shanks to receive the end of the insulator-bolt, a taper-collar provided with an inwardly-projecting annular flange placed over the shanks of the jaws, the insulator-bolt inserted in the socket and a shoulder thereon to engage the flange on the collar and force it over the tapered shank, substantially as described.

2. In an ear or hanger for supporting electric conductor-wires, the combination with two jaws of upwardly-extending divided shanks, such shanks being tapered and furnished with an internally-screw-threaded socket one part in each shank to receive the screwed end of the insulator-bolt a collar with inwardly-projecting annular flange placed over the tapered shanks of the jaws an insulating and supporting screw inserted in the socket and a shoulder on the said insulator-bolt to engage the annular flange and force the collar over the shank substantially as described.

In witness whereof I have hereunto signed my name in the presence of two subscribing witnesses.

ABRAHAM RICHARDSON.

Witnesses:
 J. OWDEN O'BRIEN,
 B. TATHAM WOODLICALL.